M. H. WINEBRENER.
ICE-CUTTER.
No. 192,609. Patented July 3, 1877.
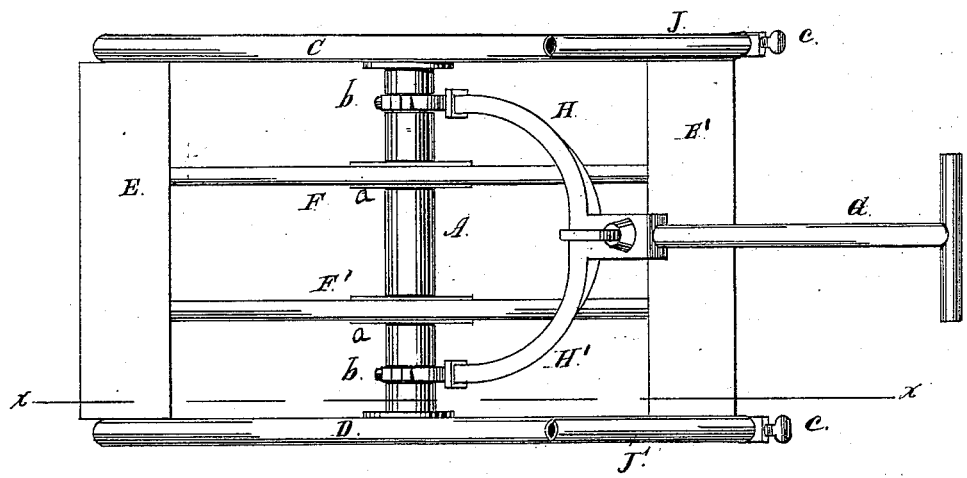
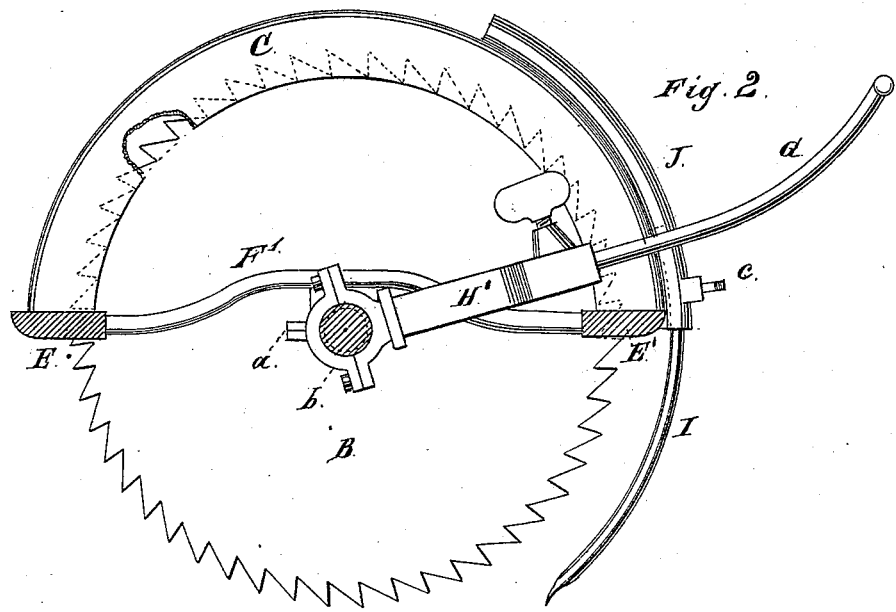
Witnesses:
O. W. Bond
F. F. Bruns.
Inventor:
Marshall H. Winebrener

UNITED STATES PATENT OFFICE.

MARSHALL H. WINEBRENER, OF CHICAGO, ILLINOIS.

IMPROVEMENT IN ICE-CUTTERS.

Specification forming part of Letters Patent No. 192,609, dated July 3, 1877; application filed March 22, 1877.

*To all whom it may concern:*

Be it known that I, MARSHALL H. WINEBRENER, of the city of Chicago, in the county of Cook and State of Illinois, have invented new and useful Improvements in Ice-Cutters, of which the following is a full description, reference being had to the accompanying drawings, in which—

Figure 1 is a plan view; Fig. 2, a vertical section at line *x* of Fig. 1.

Ice-houses can be filled by repeatedly flooding and freezing, forming a solid body of ice. Suitable means for the removal of such ice have not been provided.

My improvement is primarily designed to be used in cutting out ice from ice-houses; and it consists in the use of one or more circular saws, secured to a shaft set in a frame, which shaft is to be driven by any suitable means, and in devices for regulating the depth of the cutting and for moving the saws forward.

In the drawings, A represents a shaft, upon each end of which is secured a circular saw, B. C D are guards, which protect the upper portions of the saws. E E' are cross-bars, secured at the ends and upon the inner sides of these guards C D. F F' are two longitudinal bars, connecting the two bars E E' together. These bars F F' are provided with boxes *a*, which encircle the shaft A, and by means of which the guards and connecting-bars E E' are supported upon the shaft A. The guards and bars E E' F F' form a frame. G is a handle, by means of which the device is moved forward. The inner end of this handle has two branches, H H', the ends of which are provided with boxes or straps *b*, which encircle the shaft A and move in grooves therein. I I are two adjustable supports, which can be moved in the sockets or tubes J J' upon the guards C D. These supports are held in place by set-screws *c*.

The shaft A, with the saws, can be conveniently driven by a rotary air-engine secured to the shaft, air being supplied from a stationary pump or engine through a flexible tube.

The saws are to be located at such distance apart as may be desired, depending upon the width of the blocks of ice to be cut. I have only shown two saws, but a greater number may be used.

The saws are rotated as before stated, and the device may be moved forward by hand-power, applied to the handle G.

In use, the device is to be placed upon the ice, and the shaft and saws put in motion, the supports I I having first been adjusted with their points resting upon the top of the ice. As the saws rotate they will cut down into the ice, and after the saws begin to cut the supports I I can be loosened and passed up into the sockets J J'. The saws will continue to cut down into the ice until one or both of the bars E E' come in contact with the ice; then, by pushing upon the handle G, the saws can be moved along while they are rapidly rotated, and the ice will be cut to a uniform depth, which depth depends upon the size of the saws and the position of the bars E E'.

As represented, the bar E only will rest on the ice, but if the guards C D should be made a little longer, bringing the bars E E' a little lower down, then both E and E' would rest on the ice, while the saws perform the cutting.

I have now described the method of cutting down into the ice from the top. The first tier of blocks must be removed by hand; then by the use of a single saw resting upon the top of the ice from which said tier has been removed, and arranged to move in a horizontal plane, the several rows of blocks can be cut out on the under side.

When only two saws are used for vertical cutting, one of them may be removed when it is desired to cut horizontally; but, if more than two saws are used, it will be more convenient to have a single saw arranged expressly for the horizontal work.

The handle G is secured to the forked part H H' by means of a set-screw, so that when a single saw is turned down so as to cut horizontally, the handle can be turned correspondingly. In cutting out the ice the device should first be used in one direction, and afterward at right angles thereto, thus cutting the ice into square blocks of uniform size.

What I claim as new, and desire to secure by Letters Patent, is as follows:

1. The frame E E' F F', in combination with and resting upon the shafts A, and one or more saws, B, substantially as specified.

2. The adjustable supports I, in combination with the frame, shields, and socket J, substantially as and for the purpose set forth.

3. The combination of the frame E E' F F', axle A, and one or more saws B, with the pivoted push-handle G, so that the device may be operated either vertically or horizontally, substantially as specified.

MARSHALL H. WINEBRENER.

Witnesses:
O. W. BOND,
H. F. BRUNS.